Aug. 23, 1966     W. E. DELANEY     3,268,257
KNEE REST FOR DRIVER OF AUTOMOBILE
Filed July 1, 1964
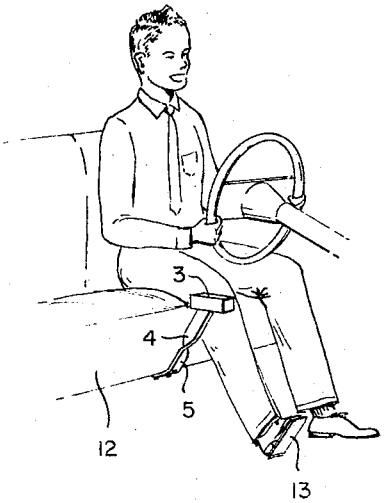
FIG. 1
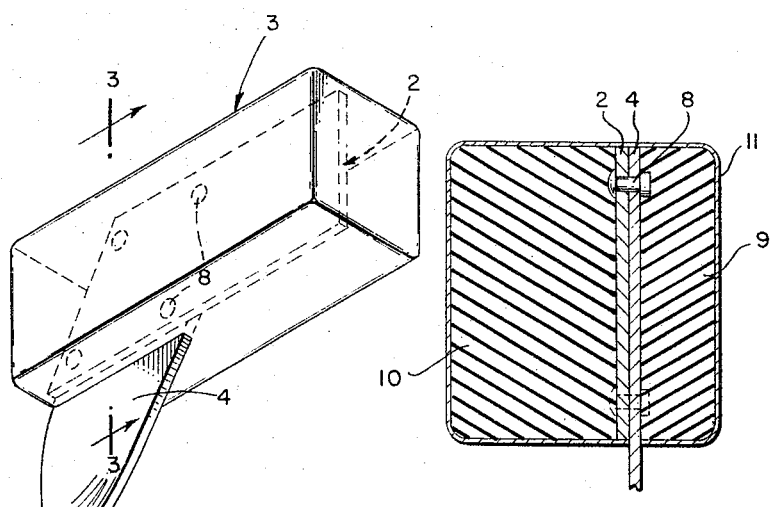
FIG. 2
FIG. 3
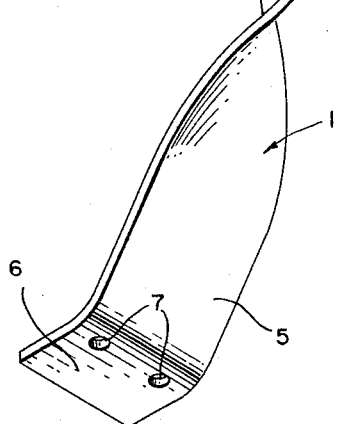
WILLIAM E. DELANEY
INVENTOR.
BY 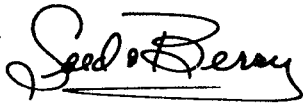
ATTORNEYS

United States Patent Office 3,268,257
Patented August 23, 1966

3,268,257
KNEE REST FOR DRIVER OF AUTOMOBILE
William Earl Delaney, 12253 8th NW., Seattle, Wash.
Filed July 1, 1964, Ser. No. 379,490
1 Claim. (Cl. 297—427)

The present invention relates in general to a knee rest for a seated person and in particular to a knee rest for the operator of a vehicle or other machine. The need for such a device exists when a person must remain in a seated position over an extended period of time while manipulating a treadle such as an automobile accelerator with little opportunity to stretch or relax his leg muscles. Under such conditions as, for instance, an extended automobile trip, the operator must not only operate the treadle constantly which requires the use of certain leg muscles but must also maintain his leg in position which requires the use of additional muscles. Constant use of the leg muscles under these conditions results in fatigue and discomfort if the position has to be maintained for a very long period and may be a serious problem with older persons. In the operation of an automobile particularly, there is often no room to change positions to any great extent during operation of the vehicle and the operator must either stop to stretch his legs or suffer the discomfort.

The present invention aims to provide a bracket-type knee rest particularly adapted to use on an automobile seat but not necessarily limited to such use. With the device of the present invention, the driver's leg is held in an upright position by contact with the knee rest, requiring no effort on the part of the driver.

The primary object of the present invention is, therefore, to provide a knee rest for supporting a machine operator's leg in an upright relaxed position to prevent fatigue.

Another object of the present invention is to provide a knee rest of the character described having a cushioned pad for contacting the operator's knee or leg without causing discomfort to the operator.

Another object of the present invention is to provide a knee rest of the character described which is sturdy and capable of being located in a fixed position at the side of the operator's leg.

Another object of the present invention is to provide a knee rest of the type described which is especially adapted to be mounted to the operator's seat or chair without interfering with the operator's control of the automobile or other vehicle or machine.

The means by which the foregoing objects and advantages, which will be apparent to those skilled in the art, are accomplished are set forth in the following specification and claims and are illustrated in the accompanying drawings dealing with a preferred embodiment of the present invention. Reference is made now to the accompanying drawings in which:

FIG. 1 is an illustration of the use of the knee rest of the present invention by a vehicle operator;

FIG. 2 is a perspective view of the knee rest; and

FIG. 3 is a cross-section taken along lines 3—3 of FIG. 2.

Referring now to the drawings, wherein like reference numerals are used to indicate identical parts in the various views, FIG. 2 is an illustration of the overall device which includes a bracket arm 1, a mounting arm 2 and a knee pad indicated generally by the numeral 3. Although the bracket arm 1 may take any one of a multitude of different configurations, the arm 1 in the preferred embodiment shown is constructed from a flat metal strip of sufficient width and thickness to withstand the pressure applied during use and to remain upright and stationary during such use. The arm 1 may be constructed from any metallic or nonmetallic material capable of being formed as desired and of sufficient strength to serve the purpose. The arm 1 has a 90° twist as illustrated with the top end portion 4 being located in a plane at right angles to the plane of a bottom portion 5. The bottom portion 5 includes an angular terminal end portion 6 with holes 7 for mounting the knee rest to an automobile seat, chair or the like.

The mounting arm 2 may be made from the same material as the arm 1 and is fixed to the top end of the arm 1 and projects laterally therefrom. The arm 2 is rigidly connected to the arm 1 by means of the rivets 8 and it will be understood that any desirable means such as welding or screw fastening means may be used to connect the members. The top and one end edge of the arm 2 may be made flush with the top edge and one side of the arm 1 with the arm 2 extending at an obtuse angle from the arm 1 so as to be generally horizontal when the knee rest is in the mounted position shown in FIG. 1. It will be understood, of course, that the exact shape of the arm 2 may be widely varied with the desirable characteristic being that of being in a substantially horizontal position when the bracket is mounted.

The knee pad 3, which may be characterized as a yieldable contact means, is mounted on the arm 2 and completely surrounds the arm and the upper end of the bracket arm 1, to provide a cushion for the user's knee or leg and to cover the sharp edges of the arms 1 and 2. The pad 3 comprises first and second cushion elements 9 and 10 which may be composed of any deformable or elastic material such as foam rubber or foam plastic and may be varied in size and configuration as desired. The thicker cushion element 10 shown in the drawing is used for contacting the operator's knee while the cushion element 9 is used primarily to cover the irregularities of the joint between the arms 1 and 2. The cushion elements 9 and 10 are provided with a continuous cover 11 which may be made of leather, cloth or the like for appearance sake and which also serves to prevent the cushion elements from being stripped from the arm 2. It will be advisable to adhesively bond the faces of the cushion elements to the arm 2 to hold them in place during use.

As shown in FIG. 1, the angled end 6 of the arm 1 is bolted or otherwise fastened at a convenient location to the bottom edge of the automobile seat or other seat 12 with the angle between the portions 5 and 6 of the arm 1 being such as to incline the arm upwardly and outwardly from the front face of the seat with the arm 2 being substantially horizontal. One convenient method of attaching the portion 6 to the seat is by the use of self-threading screws or metal screws so as to hold the bracket arm firmly in place. It will be understood that the means for mounting the bracket arm may be modified as desired and, in some cases, it would be desirable to provide a pivotal mounting for the bracket arm for the purpose of rotating the arm downwardly or to one side when not in use. Any such modification would be well within the skill of a mechanic and would not depart from the scope of the present invention.

When in use, the knee rest should be located and fixed in the position shown in FIG. 1. In this position, the knee pad 3 contacts the operator's knee or upper leg so as to allow the operator to relax his leg muscles while his leg is thus held in the upright position for operating the accelerator pedal 13 or any treadle on a vehicle or other machine. The knee rest will thus prevent fatigue and discomfort and allow the operator to maintain his position for extended periods.

It will be readily apparent to those skilled in the art that the present invention provides novel and useful improvements in knee and leg rests of the character described. The arrangement and types of structural components utilized in this invention may be subject to numerous modifications well within the purview of this invention and applicant intends only to be limited to a liberal interpretation of the specification and appended claim.

Having thus described the invention, what is claimed as new and desired to be secured by Letters Patent is:

In combination with a machine operator's seat, a knee rest comprising; an elongated flat metal bracket arm having one end thereof bolted to the underside of said seat with the arm being inclined upwardly away from the seat, said bracket arm being twisted along its length with the upper end thereof in a vertical plane parallel to the general plane of the user's leg and at substantially 90° to the plane of the lower end thereof, a flat metal mounting arm fixed to the upper end of said bracket arm and extending in a vertical plane in a generally horizontal direction away from the seat and parallel with the plane of the upper end of said bracket arm, first and second cushioned elements mounted on opposite sides of said mounting arm, said cushioned elements covering both sides of said mounting arm and the connection between said mounting arm and said bracket arm, and a flexible cover surrounding said cushion elements, whereby said rest provides a fixed support for the user's knee and leg with said bracket arm including the twisted portion thereof being maintained away from the user's leg.

References Cited by the Examiner

UNITED STATES PATENTS

| | | | |
|---|---|---|---|
| 2,225,818 | 12/1940 | Brooks | 297—427 |
| 2,229,789 | 1/1941 | Arndt et al. | 297—427 |
| 2,457,972 | 1/1949 | Bailey | 248—300 |
| 2,554,176 | 5/1951 | Edward | 248—300 |
| 2,555,814 | 6/1951 | Pulsifer | 297—391 |
| 2,627,903 | 2/1953 | Stevenson | 297—254 |
| 2,749,973 | 6/1956 | Leasy | 297—427 |
| 3,018,134 | 1/1962 | Shiplett | 297—427 |

FRANK B. SHERRY, *Primary Examiner.*

C. A. NUNBERG, *Assistant Examiner.*